(12) United States Patent
Lee et al.

(10) Patent No.: US 12,244,709 B2
(45) Date of Patent: Mar. 4, 2025

(54) UPDATING KEYS USED FOR ENCRYPTION OF STORAGE CIRCUITRY

(71) Applicant: Arm Limited, Cambridge (GB)

(72) Inventors: Jaekyu Lee, Austin, TX (US); Yasuo Ishii, Austin, TX (US); Dam Sunwoo, Austin, TX (US)

(73) Assignee: Arm Limited, Cambridge (GB)

( * ) Notice: Subject to any disclaimer, the term of this patent is extended or adjusted under 35 U.S.C. 154(b) by 356 days.

(21) Appl. No.: 16/550,598

(22) Filed: Aug. 26, 2019

(65) Prior Publication Data

US 2021/0067335 A1 Mar. 4, 2021

(51) Int. Cl.
*H04L 9/08* (2006.01)

(52) U.S. Cl.
CPC ................... *H04L 9/0891* (2013.01)

(58) Field of Classification Search
CPC ..................................... H04L 9/0891
USPC ............................................. 713/189
See application file for complete search history.

(56) References Cited

U.S. PATENT DOCUMENTS

| | | | |
|---|---|---|---|
| 9,646,172 B1 * | 5/2017 | Hahn | G06F 21/602 |
| 10,275,611 B1 * | 4/2019 | Yu | G06F 16/33 |
| 2002/0120579 A1 * | 8/2002 | Kawaguchi | G06F 21/121 |
| | | | 705/59 |
| 2005/0166050 A1 * | 7/2005 | Kosaki | H04N 21/63345 |
| | | | 375/E7.025 |
| 2006/0143084 A1 * | 6/2006 | Donnelli | G06Q 30/0273 |
| | | | 705/14.69 |
| 2007/0194117 A1 * | 8/2007 | Takashima | G11B 20/00492 |
| | | | 235/454 |
| 2008/0123853 A1 * | 5/2008 | Huh | H04L 9/0836 |
| | | | 380/273 |
| 2009/0075630 A1 * | 3/2009 | McLean | H04L 63/0428 |
| | | | 455/411 |
| 2009/0300351 A1 * | 12/2009 | Lei | G06F 16/986 |
| | | | 707/999.005 |
| 2012/0173882 A1 * | 7/2012 | Horn | G06F 21/78 |
| | | | 713/189 |
| 2017/0026173 A1 * | 1/2017 | Masek | G06F 16/2228 |
| 2017/0235749 A1 * | 8/2017 | Beaverson | G06F 16/9017 |
| | | | 707/747 |
| 2017/0257214 A1 * | 9/2017 | Stufflebeam | H04L 63/20 |
| 2017/0286421 A1 * | 10/2017 | Hayenga | G06F 12/0875 |
| 2018/0145831 A1 * | 5/2018 | Garagnon | G06F 21/602 |
| 2018/0293179 A1 * | 10/2018 | Lea | G06F 21/79 |
| 2019/0121872 A1 * | 4/2019 | Feng | G06F 16/13 |
| 2019/0215160 A1 * | 7/2019 | Lasko | G06F 21/602 |

(Continued)

*Primary Examiner* — Dereena T Cattungal
(74) *Attorney, Agent, or Firm* — NIXON & VANDERHYE P.C.

(57) ABSTRACT

A data processing apparatus is provided that includes storage circuitry. Communication circuitry responds to an access request comprising a requested index with an access response comprising requested data. Coding circuitry performs a coding operation using a current key to: translate the requested index to an encoded index of the storage circuitry at which the requested data is stored or to translate encoded data stored at the requested index of the storage circuitry to the requested data. The current key is based on an execution environment. Update circuitry performs an update, in response to the current key being changed, of: the encoded index of the storage circuitry at which the requested data is stored or the encoded data.

12 Claims, 9 Drawing Sheets

(56) References Cited

U.S. PATENT DOCUMENTS

2019/0306132 A1* 10/2019 Le Van Gong ....... H04L 9/0891
2020/0099992 A1*  3/2020 Huang ............. H04N 21/26258
2020/0169401 A1*  5/2020 Dooley ................ H04L 63/062

* cited by examiner

```
set1 = index ^ previouskey
set2 = index ^ currentkey if (set1 < N/2)
        if (set1 < count)
                return currentkey
        else
                return previouskey
else
        if (set2 < count)
                return currentkey
        else
                return previouskey
```

UPDATING KEYS USED FOR ENCRYPTION OF STORAGE CIRCUITRY

TECHNICAL FIELD

The present disclosure relates to data processing. More particularly, it relates to encryption.

DESCRIPTION

Encrypting cache structures, such as branch prediction buffers, can be useful in preventing or inhibiting side-channel attacks. One such approach would be to encrypt either the index at which particular data is stored, or to encrypt the data itself with a key that is execution-context specific. However, using a fixed key for this purpose could be problematic, since the key could be in use for long enough for it to be determined, thereby reducing security. Furthermore, such caches are often relied on for fast access. For instance, a branch prediction buffer might be relied upon at the start of the processing pipeline, where increased latencies are generally unacceptable. It is desirable to improve the security of such a system without having significantly increasing the latency of such caches as a result.

SUMMARY

Viewed from a first example configuration, there is provided a data processing apparatus comprising: storage circuitry; communication circuitry to respond to an access request comprising a requested index with an access response comprising requested data; coding circuitry to perform a coding operation using a current key to: translate the requested index to an encoded index of the storage circuitry at which the requested data is stored, or translate encoded data stored at the requested index of the storage circuitry to the requested data, wherein the current key is based on an execution environment; and update circuitry to perform an update, in response to the current key being changed, of: the encoded index of the storage circuitry at which the requested data is stored or the encoded data.

Viewed from a second example configuration, there is provided a data processing method comprising: responding to an access request comprising a requested index with an access response comprising requested data; performing a coding operation using a current key to: translate the requested index to an encoded index of storage circuitry at which the requested data is stored, or translate encoded data stored at the requested index of the storage circuitry to the requested data, wherein the current key is based on an execution environment; and performing an update, in response to the current key being changed, of the encoded index of: the storage circuitry at which the requested data is stored or the encoded data.

Viewed from a third example configuration, there is provide a data processing apparatus comprising: means for responding to an access request comprising a requested index with an access response comprising requested data; means for performing a coding operation using a current key to: translate the requested index to an encoded index of storage circuitry at which the requested data is stored, or translate encoded data stored at the requested index of the storage circuitry to the requested data, wherein the current key is based on an execution environment; and means for performing an update, in response to the current key being changed, of the encoded index of: the storage circuitry at which the requested data is stored or the encoded data.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: storage circuitry; communication circuitry to respond to an access request comprising a requested index with an access response comprising requested data; coding circuitry to perform a coding operation using a current key to: translate the requested index to an encoded index of the storage circuitry at which the requested data is stored, or translate encoded data stored at the requested index of the storage circuitry to the requested data, wherein the current key is based on an execution environment; and update circuitry to perform an update, in response to the current key being changed, of: the encoded index of the storage circuitry at which the requested data is stored or the encoded data.

In such embodiments, the storage circuitry (e.g. a cache), which provides data at particular indexes, can be encoded using two different techniques. In a first technique, the data itself could be encoded. The data is therefore encoded when it is to be stored into the storage circuitry and is decoded when it is retrieved from the storage circuitry. The second technique is to encrypt the index at which particular data is stored. For instance, the data "foo" might be ordinarily stored at an index 13, and such information may be known to the operating system for example. Invisibly, however, the data would actually be stored at a different index, achieved by encrypting the regular index value. For instance, the data "foo" might actually be stored at index 19. In either case, the desired data cannot be retrieved unless the key to the encryption process and the encryption process itself are both known. The coding circuitry is responsible for aiding in the interface between the requests that are received (that do not know about the encryption) and the storage circuitry (whose contents are encrypted in one or both of the techniques described above). The key itself is specific to the execution environment/context that owns the data. In this way, the data held by each execution context cannot easily be accessed by another execution context. In these embodiments, the update circuitry is responsible for changing the key used for encryption. To prevent data loss, the data and/or index are therefore re-encrypted using the new key. By using a new key, contents of the storage circuitry can be kept more secure than if the key never changed. Furthermore, despite changing the key, the contents of the storage circuitry are not irretrievably lost, which would incur a performance penalty due to the contents having to be recalculated/reobtained. There are a number of possibilities for how coding should be performed. However, in some embodiments, the encoding is achieved by use of a XOR operation in combination with the key. The XOR operation, aside from being efficient to implementing hardware, is extensively used in encryption algorithms.

In some examples, the update circuitry is adapted to perform a key update process for the execution environment to make the current key a previous key, and to make a new key the current key. As a consequence of the key update process, a new key is generated and the new key becomes the current key. The old current key becomes a previous key. In this way, the keys change at each key update such that there remains a current key and the previous key. The old previous key is thus discarded. However, it will be appreciated that in other embodiments, a series of keys could be kept such that the old previous key (and perhaps even older previous keys) are maintained.

In some examples, the update circuitry is adapted to perform the key update process after a period of time. The key update process therefore could occur after a period of time has elapsed. Since the key changes, it is difficult for a hacker to decrypt the content of the storage circuitry. In particular, it is anticipated that by the time the hacker was able to decode the content of the storage circuitry, the key update will have occurred causing the content of the storage to be re-encrypted thereby rendering the hacker's efforts unusable.

In some examples, the update circuitry is adapted to perform the key update process every period of time. By repeatedly performing the key update process, it is anticipated that the system will be able to keep ahead of a hacker attempting to decode the content of the storage circuitry. In particular, it may be anticipated that each time the hacker is able to decode the content of the storage circuitry, the content will be re-encrypted so that the hacker's decoding process would have to begin again. The period of time may be selected based on an estimate of how long it would take to manually (e.g. through brute force) decrypt the data. Consequently, over a period of years, as technology improves, the period of time between updates of the key update process may be shortened. In some embodiments, the key update process may be continued. In particular any spare capacity that may be available within the system could be geared towards performing the key update process so that any hacker would be chasing a moving target.

In some examples, the update circuitry is adapted to perform the update over a plurality of processor cycles. The update process need not happen instantaneously. In these examples, the update occurs over a number of processor cycles such that the workload is spread out. As a consequence of spreading out the workload in this way, the normal behaviour of the storage circuitry can be maintained as a consequence of not being monopolised by the update process. The update process need not be consistent in terms of the number of processor cycles that are required and could be adapted to the current load of other circuits within the system such as the storage circuitry.

In some examples, the update circuitry is adapted to perform the update over a plurality of processor cycles, across the storage circuitry in a given order. By performing the update process in a given order, it may be possible to determine which entries in the storage circuitry have been subject to the update process and which entries have not yet been subjected to the update process without necessitating lookup circuitry to make this determination. As a consequence, the length of time required for the update process could be dynamic if there is no obligation for the update to be performed in a particular period of time. In some examples, the length of time between updates of the key is referred to as an epoch. The epoch may be sub-divided into sub-epochs, with each sub-epoch representing the period for which a single update is made to an entry of the storage circuitry. For instance, a sub-epoch may represent the period of time required in order to perform an update of a single set in the storage circuitry (e.g. a cache).

In some examples, the data processing apparatus comprises: count circuitry to count progress of the update. The count circuitry can be implemented as a simple counter to indicate the progress of the update. Given the above examples, the count circuitry can be used in order to identify the sub-epoch of the current epoch. By determining the index of an entry and the value of the count circuitry, it is possible to determine whether that particular entry has been updated or not.

In some examples, the given order is based on an index of each entry in the storage circuitry. The index of the entry refers to the index at which the entry is actually stored within the storage circuitry. This may be different from the index that is provided as part of the access request for the associated data, which may be encrypted to obtain the actual index. In those examples in which the index is not encrypted, these two indexes may be the same.

In some examples, the data processing apparatus comprises: environment storage circuitry to store a reference to the execution environment in association with the current key. The execution environment can be considered to be the environment in which instructions are executed by the data processing apparatus. The execution environment may be made up of a combination of a number of factors including: an address space identifier, which may be used to identify a particular application instance executing on the data processing apparatus; a virtual machine identifier, which may be used in order to identify a particular machine on which the application executes; and a privilege level, which can be used to indicate the execution privilege of the application. By storing a reference to the execution environment in association with the current key, the system restricts access to particular data (by either of the techniques previously described in relation to the coding circuitry) to that particular execution environment. Another execution environment, lacking access to the necessary key, may be able to access the storage circuitry, but cannot decrypt obtained data, or determine where desired data is located within the storage circuitry.

In some examples, the reference to the execution environment is also stored in association with the previous key. By providing both the current key and the previous key for each execution environment, the update process can be performed over a period of time. That is, two keys are provided and one of the two keys can be used to perform decryption depending on the progress of the update process. Since two keys are provided for each execution context, there is no need for a single key to be shared by each execution context.

In some examples, entries of the environment storage circuitry are accessed in parallel. In some situations, it may be necessary to locate the key associated with a particular execution environment. To this end, in these examples, the entries of the environment storage circuitry are accessed in parallel. In this way, it is possible to quickly obtain the key associated with the particular execution environment rather than having to sequentially check each entry of the execution environment storage circuitry. By making it possible for the environment storage circuitry to be accessed in parallel, this check can be performed quickly, and thus does not necessitate a smaller environment storage circuitry that would be more amenable to being sequentially checked within a smaller space of time for the key of a matching execution environment.

In some examples, the coding circuitry is adapted to perform the coding operation by selecting one of the current key and the previous key; and if the coding circuitry produces an encoded index, the one of the current key and the previous key is dependent on a value of the count circuitry and the encoded index, otherwise, the one of the current key and the previous key is dependent on a value of the count circuitry and the index. The coding operation will use either the current key or the previous key. In practice, this will depend on the progress made of the update process over the storage circuitry. In particular, the more complete the update process, the more entries in the storage circuitry will use the current key as opposed to the previous key. Since the update process is performed in a particular order, it is possible to determine whether a given entry of the storage circuitry has been subjected to the update process or not. Where the index of an entry is being encoded (i.e. the index at which particular data is stored is different to what would be expected by, for instance, the operating system) then the choice of the current key or previous key is dependent on both a value of the count circuitry and the encoded index at which the data value is actually stored. In other situations, the non-encoded index is used to make this determination in combination with the count circuitry. In other words, the determination is based on the progress of the update circuitry and the location where the data is actually stored in the storage circuitry—with the update process iterating through the storage circuitry in order.

In some examples, the coding circuitry is adapted to perform the coding operation using the current key to translate the requested index to the encoded index of the storage circuitry at which the requested data is stored.

In some examples, the update circuitry is adapted to invert a most significant bit of the current key to produce the new key. There are a number of ways in which the key can be selected. In many embodiments, the key can be selected randomly. However, this process can make the update complicated. In particular, since the XOR operation is transitive, two entries in the storage circuitry will be swapped as a consequence of the key update process when the coding process involves performing a XOR operation. Consequently, unless one keeps track of those entries that have already been swapped, any change in index can be inadvertently "undone". For example, consider the situation in which the key update process is performed on storage circuitry containing four entries. During the key update process, entries 1 and 2 are swapped. Then entries 2 and 1 would be swapped. This causes the entries to be restored to their original position. This can be avoided by providing additional storage and storing a reference to those entries that have already been swapped. A swap can then be limited so that it is only performed on entries that have not already been swapped. However, this not only involves extra storage, but means that a lookup operation must be performed in order to determine whether a given entry has been updated or not. In practice, such a lookup operation would be either expensive in terms of hardware or would be unacceptably slow for requests made to certain types of storage circuitry. The current examples resolve this difficulty by effectively splitting the storage circuitry in half This is achieved by inverting a most significant bit of the current key to produce the new key. For instance, when the previous key was '10111', the new key will start with a '0', regardless of the remaining bits in the key and how they are selected. In this way, the swap process will cause an entry in the top half of the storage circuitry to move to the bottom half of the storage circuitry. The update process therefore only need consider the first half of the storage circuitry, at which point the bottom half of the storage circuitry will also have been updated. This makes the update process efficient. In particular, it is not necessary to track those entries for which a swap has already occurred. Furthermore, provided the index is sufficiently large, this would be expected to have a negligible effect on the randomness of the newly generated keys.

In some examples, the storage circuitry comprises a plurality of banks; given bits of the encoded index indicate which of the banks is used to store the requested data; and the update circuitry is adapted to invert at least one of the given bits of the current key to produce the new key. A further difficulty that can occur with the key selection process is that the new key and the previous key could both refer to the same physical structure implementing the storage circuitry. In practice, a storage circuitry may be logically viewed as a single distinct structure but may actually be made up of a number of distinct physical parts. This distribution may provide physical limitations on the amount of data that can be input and output. For instance, there may only be provided a single port for each physical structure within the storage circuitry. Consequently, if data must be read from, updated and written back to the same storage structure, this places a larger strain on a specific data structure within the storage circuitry. If that storage structure happens to be in use at the time (e.g. by instructions which are given priority) then the update process may have to wait for a period of time until sufficient capacity is available for the update process to be performed. This can be partly resolved by selecting the key such that the bit used to identify the physical structure (e.g. bank) of the storage circuitry is inverted between the new key and the previous key. In this way, when the key is applied to the index, it will move between structures at each update.

In some examples, a most significant bit of the given bits is inverted by the update circuitry to produce the new key. Where a number of bits are used to determine the physical structure (e.g. bank), the inverted bit is the most significant of these bits. In other embodiments, one of these bits may be selected in a different manner such as the least significant bit.

In some examples, the coding circuitry is adapted to perform the coding operation by selecting one of the current key and the previous key; and if the count circuitry indicates that the update process has reached the encoded index that would be generated using the one of the current key and the previous key then the encoded index is generated using the one of the current key and the previous key, otherwise the encoded index is generated using the other of the current key and the previous key. Such logic can be used in order to determine how the two keys should be chosen between when the index is encrypted.

In some examples, the storage circuitry provides a mapping between program counter values and data associated with the program counter values. For instance, the storage circuitry could take the form of a cache such as a branch predictor used to determine the existence, direction, or target of a branch instruction within a block of instructions represented by the program counter value.

Particular embodiments will now be described with reference to the figures.

Figure 1:
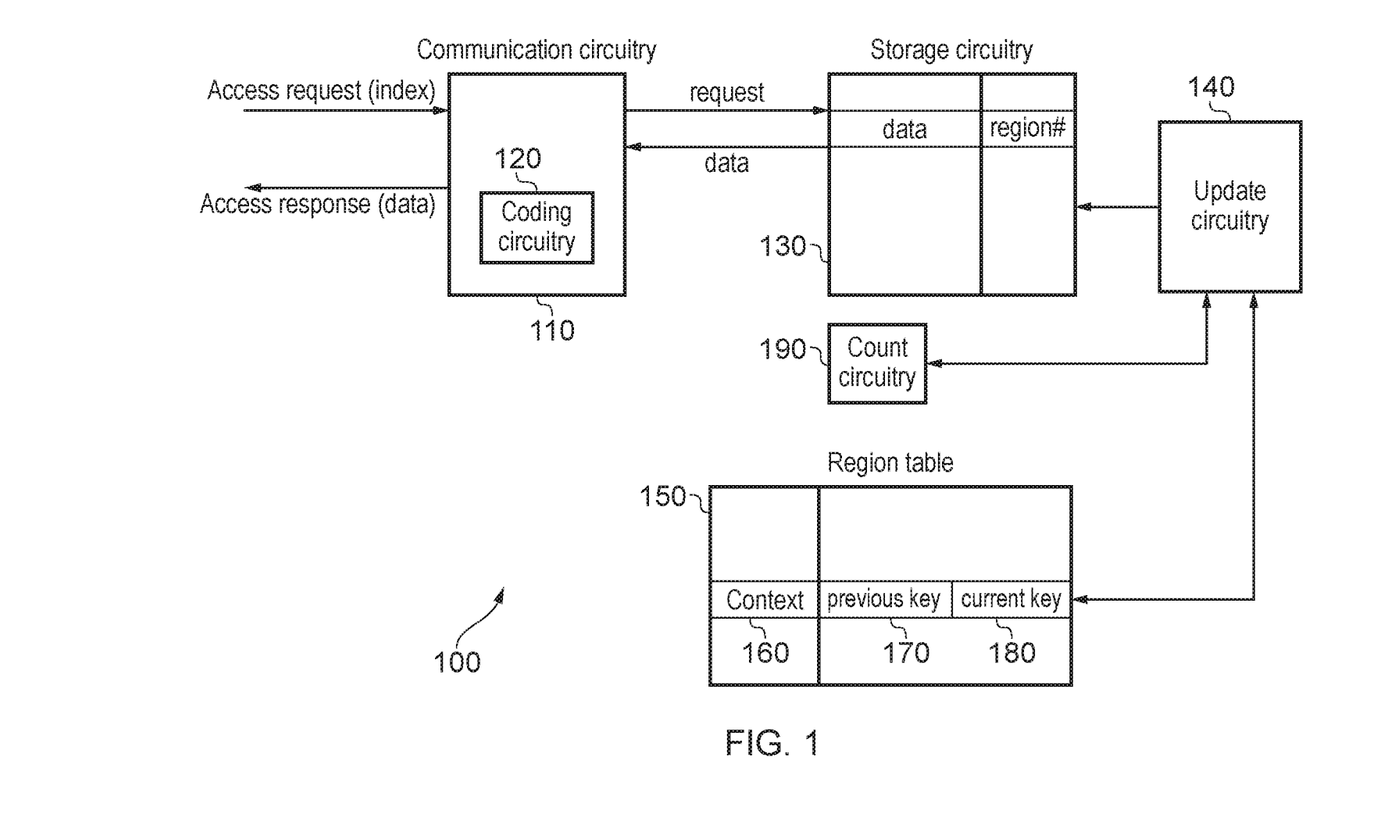
FIG. 1 illustrates an apparatus in accordance with some embodiments.

FIG. 1 illustrates an apparatus 100 in accordance with some embodiments. The apparatus includes communication circuitry 110, which is responsible for receiving access requests in relation to data stored at a particular index of the storage circuitry, and also for sending responses to those access requests. At least one of the data and the index of that data in the storage circuitry is encrypted. Coding circuitry 120 is provided as part of the communication circuitry 110 in order to act as an interface. In particular, the coding circuitry 120 performs a coding operation to translate between the un-encrypted form of the index/data and the encrypted from of the index/data.

Data in the storage circuitry 130 is also associated with a region identifier. The region identifier corresponds with an index of a region table 150. Within this, an execution context 160 is associated with keys used for the encryption, which is therefore execution context specific. Consequently, an application running within one execution context is able to obtain the key in order to perform encryption/decryption for its own context via the coding circuitry 120. Consequently, the data stored by that application can still be accessed by use of its key. However, in a different execution context, the keys 170, 180 are not available. Data belonging to a different application cannot, therefore, be accessed by the current application. In particular, even if the storage circuitry 130 can be accessed then either the data cannot be decrypted, or the location in the storage circuitry 130 where the data is actually located (rather than the logical location provided in the access request), cannot be correctly determined.

In this example, the keys stored with each execution context 160 include a current key 180 and a previous key 170. The previous key 170 and the current key 180 are both provided in order to assist in the update process performed by update circuitry 140 in which the key used for encryption is changed.

The update circuitry 140 is responsible for performing the update process in which the encrypted index/data in the storage circuitry is re-encrypted using a new key (the current key 180). The update occurs in response to an event occurring such as the expiration of a period of time. By storing both the previous key 170 and the current key 180 in the region table 150, the data/index can be decrypted and re-encrypted.

Count circuitry 190 is used to measure the progress of the update process performed by the update circuitry 140. In this way, it is possible to determine which of the two keys 170, 180 applies for a given execution context 160.

Figure 2:
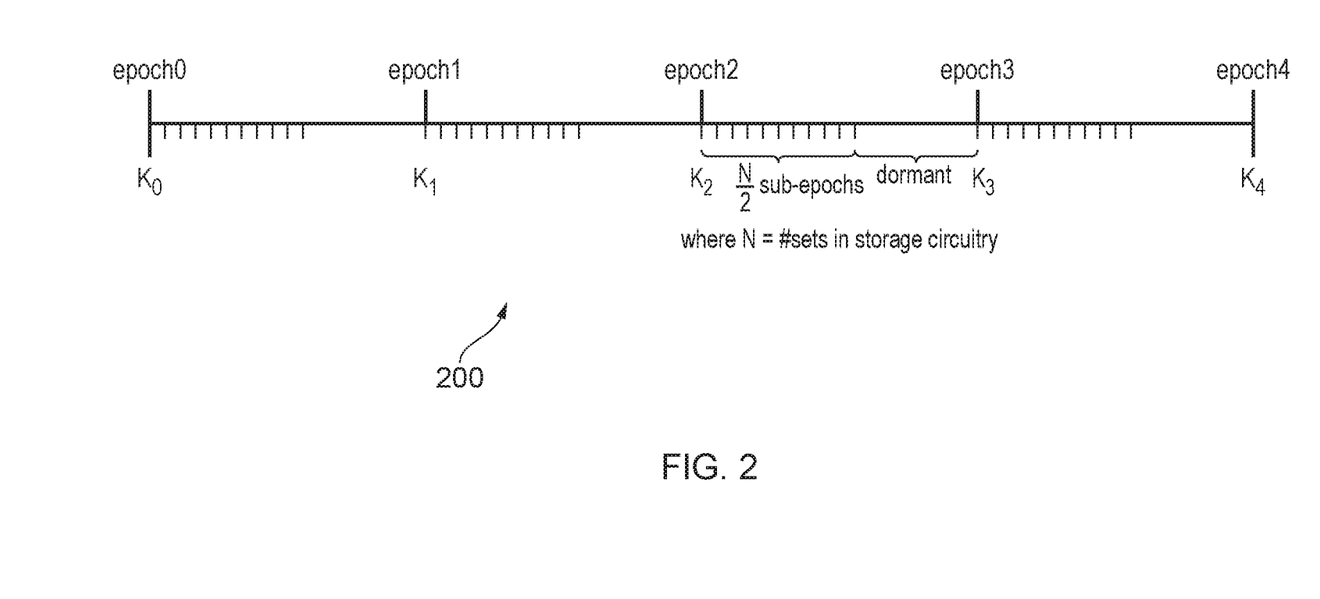
FIG. 2 illustrates a timeline that demonstrates the update process in accordance with some embodiments.

FIG. 2 illustrates a timeline 200 that demonstrates the update process in accordance with some embodiments. The timeline 200 indicates the changing of keys K for a particular execution context. As illustrated, the replacement keys are selected at the start of each epoch. The epochs may last for fixed intervals such as every ten seconds. Consequently, during this period, entries of the storage circuitry should be updated. Any entries that are not updated with the newly chosen key could be lost at the start of the following epoch when the previous key is removed and decryption of the data and/or index is no longer feasible. If this occurs, it may be expected that a small performance hit will be taken to reretrieve or recalculate the desired data. Furthermore, during this period, the loss of the data could also lead to further performance penalties. For instance, in some embodiments, the storage circuitry may take the form of a branch predictor. In such a situation, if the data relating to branch prediction is not re-encrypted by the time the next epoch starts, then that key to decrypting that data will be lost and so cannot be reaccessed. In this case, the data relating to that branch is lost so a performance penalty may be expected as a consequence of not having sufficient data to accurately perform branch prediction in the future. Of course, over time, replacement data may be generated. However, this may take a number of processor cycles, may require particular program flow in order for branch prediction data to be rebuilt.

Each epoch contains a number of sub-epochs. These sub-epochs may completely divide each epoch or may be followed by a dormant period during which no update occurs. Sub-epochs may have a dynamic length. The current sub-epoch number may be stored as part of the count circuitry 190 and each sub-epoch may be responsible for re-encrypting a particular entry (such as a set) of the storage circuitry. For instance, for storage circuitry having N entries, there may be N/2 sub-epochs in each epoch. Accordingly, it is possible to determine, if entries of the storage circuitry are updated in order, which entries have been updated.

A $\log_2 N$ bit counter can be used to represent the sub-epoch number. The most significant bit of this counter can be used to indicate whether the update process is complete for the current epoch (and is therefore in the 'dormant' phase, if one exists).

Figure 3:
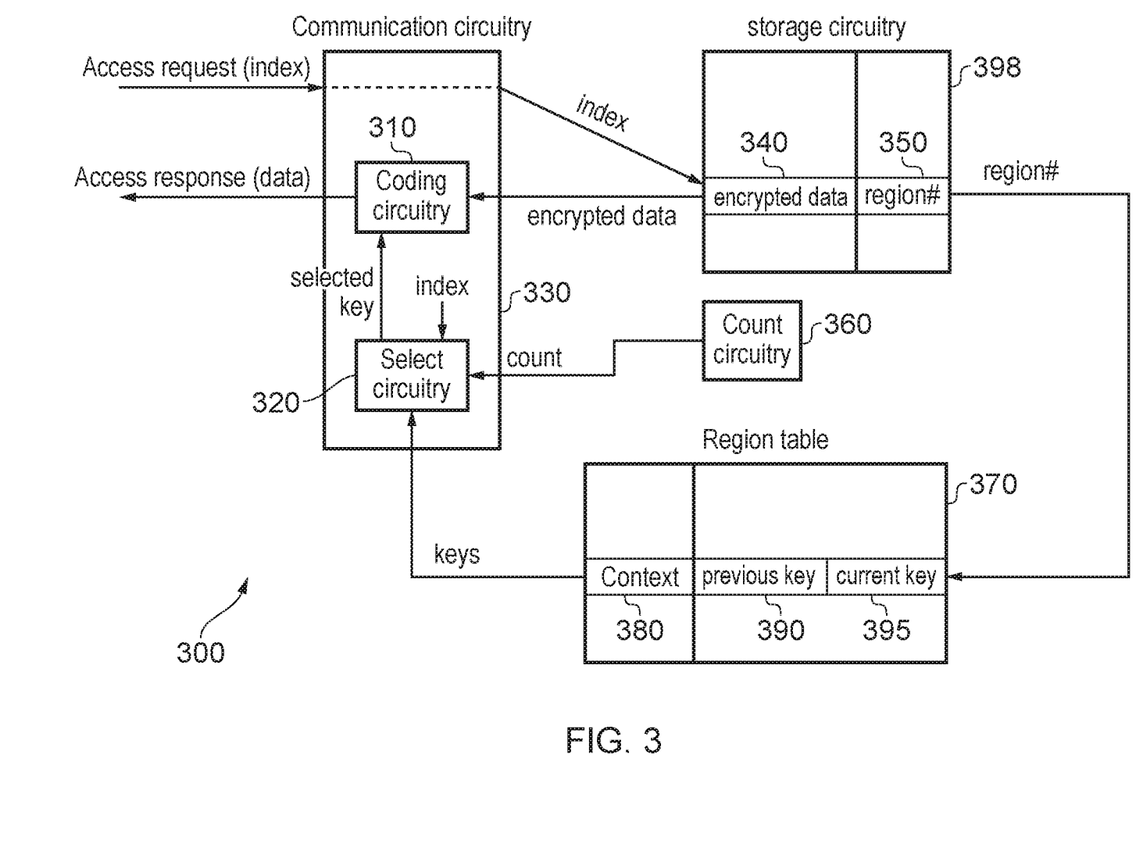
FIG. 3 illustrates an apparatus in which the data stored within the storage circuitry is encrypted in accordance with some embodiments.

FIG. 3 illustrates an apparatus 300 in accordance with some embodiments in which the data stored within the storage circuitry is encrypted. In this example, an access request for data is received by the communication circuitry 330. The access request includes a reference to an index at which the desired data is provided. The index is used by the communication circuitry to request the data stored in the storage circuitry 398 at the requested index. The encrypted data 340 at the requested index is returned to coding circuitry 310 of the communication circuitry. In associate with this index is a region identifier 350. This region identifier 350 is used to identify an index of region table 370. At the requested index of the region table 370 is an execution context 380, a previous key 390, and a current key 395. The previous key represents the key that was valid for a previous epoch. The current key 395 represents a key that is to be used for the current epoch. However, as previously explained, the current key may not yet have been updated from the previous key for a particular entry. The keys are passed to the select circuitry 320 of the communication circuitry 330. The select circuitry 320 is responsible for selecting one of the keys 390, 395 to perform the decoding process (using a XOR operation) in the coding circuitry 310 using the selected key. In this example, it is a simple question of whether the requested index in the access request is less than the count circuitry 360 which indicates the progress of the update process. If the index is less than the value of the count circuitry 360, then the previous key 390 is used. Otherwise, the current key 395 is used. Having selected a key, the select circuitry 320 passes the selected key to the coding circuitry 310. The coding circuitry 310 uses the selected key together with the encrypted data returned from the storage circuitry to perform decryption. The decrypted data then forms part of the access response which is used to respond to the access request at the communication circuitry 330.

Note that for this particular process, the execution context 380 in the region table 370 is not strictly necessary. In practice, however, such information may be provided so that new entries into the storage circuitry 398 can be associated with the correct index of the region table 350.

Figure 4:
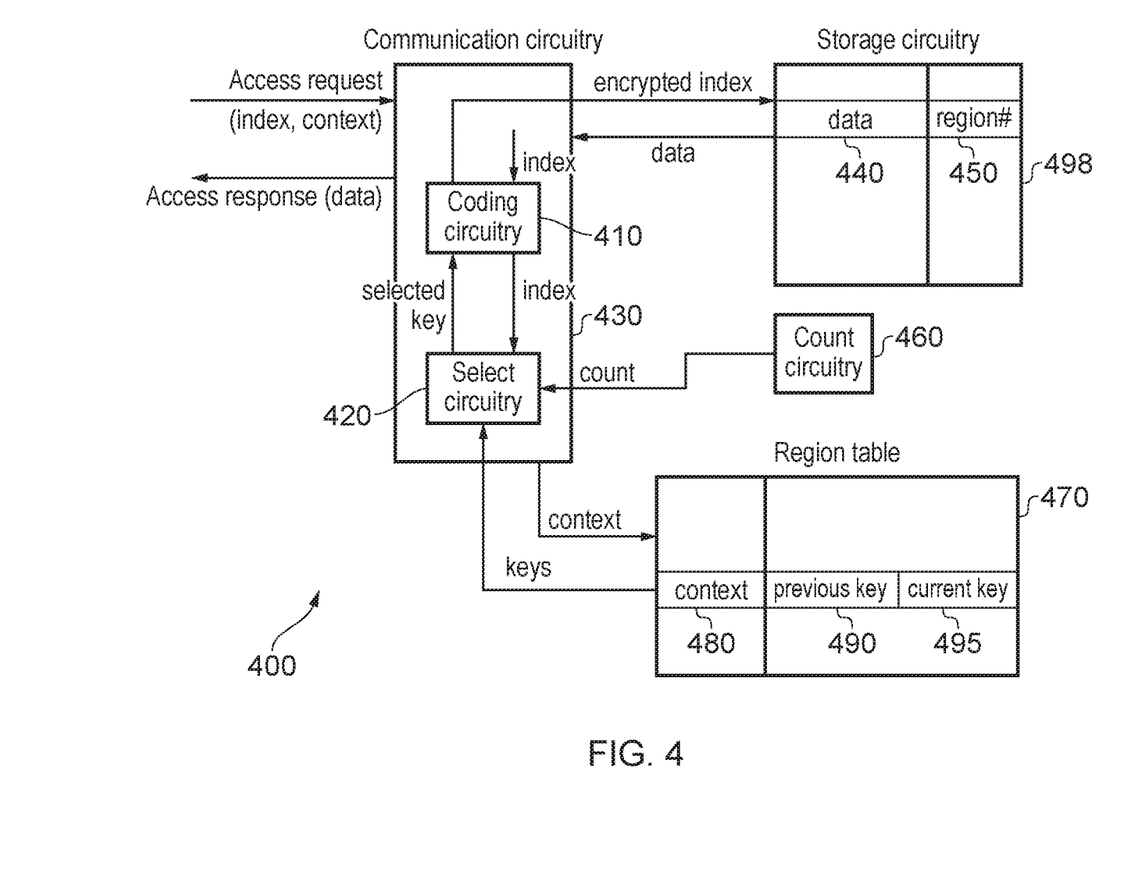
FIG. 4 illustrates an apparatus in which the index at which data is stored within the storage circuitry is encrypted in accordance with some embodiments.

FIG. 4 illustrates an apparatus 400 in which the index at which data is stored within the storage circuitry is encrypted in accordance with some embodiments. In this example, an access request is received including an index and an identification of an execution context. The identification of the execution context could include one or more of: an address space identifier, which may be used to identify a particular application; a virtual machine identifier, which may be used to identify a particular machine; and a privilege level, which is used to indicate the mode in which the executions are executed. The access request is received by communication circuitry 430. The context that is received from the access request is used to search the region table 470. The region table 470 is sufficiently small (e.g. 12 entries) that this can be carried out by a sequential search. However, in other embodiments, the region table 470 may be such that all entries can be accessed in parallel in order to search for a matching entry. Having matched the context supplied in the access request to a context 480 in the region table 470, a previous key 490 and current key 495 associated with that selected context 480 are returned to the select circuitry 420. Once again, the count circuitry 460 is used to determine which of these two keys 490, 495 should be used. This process is shown in more detail with respect to FIG. 6. However, in this example, the select circuitry 420 firstly attempts the previous key. In applying the previous key to the requested index, if the resulting decoded index is less than the count value stored in the count circuitry 460, then the update process would have reached this index already and therefore the current key 195 is selected. Otherwise, the previous key is used. Of course, in practice, the determination of the key can be determined in parallel rather than by sequential access logic. Having selected a key, the selected key is passed to the coding circuitry 410 to encode (using a XOR operation) the index that is supplied in the access request. This encoded index is then used to access the storage circuitry 498. In particular, the index that the access request provided is not accessed. Instead, the requested data is actually accessed from the encrypted index. That is, to the operating system, the data appears to be stored at the requested index. In practice, however, the data is actually stored at a different index in the storage circuitry. The data 440 stored at that encrypted index is then retuned to the communication circuitry 430, which forms the basis of the access response that is issued in response to the access request.

In this example, there is no strict need for the region identifier 450 to be stored. However, in many embodiments, this information is provided so that the execution context associated with an entry of the storage circuitry is available.

In the example of FIGS. 3 and 4, the update process may be performed by simply iterating through each element of the storage circuitry 398 in order and decrypting and re-encrypting the data stored therein. Since encryption and decryption is performed, in these examples, using XOR, the re-encryption can be performed in a single operation. In particular, consider the following equations, where P represents the unencrypted index, $K_i$ represents the current key at epoch i and $Set_i$ represents the encrypted value at epoch i. The SwapKey is the key used to convert one encrypted value (index or data) using one key to another key.

$Set_i = P\ XOR\ K_i$
$Set_{i+1} = P\ XOR\ K_{i+1}$
$P = Set\ XOR\ K_i$
$Set_{i+1} = (Set\ XOR\ K_i)\ XOR\ K_{i+1}$
$Set_{i+1} = Set_i\ XOR(K_i\ XOR\ K_{i+1})$
$Set_i = Set_{i+1} XOR\ (K_i\ XOR\ K_{i+1})$
$SwapKey = (K_i\ XOR\ K_{i+1})$ However, in the system of FIG. 4, the update process involves moving the physical location where data is stored in the storage circuitry 498. Since the XOR operation is transitive, entries in the storage circuitry 498 are updated by being swapped. However, this makes it difficult to track those entries that have been updated. For instance, if the update process involves firstly swapping sets zero and four, then at a future time, i.e. when set four to be handled, entries four and zero will be swapped again—reversing the swap. One way to deal with this would be to add a further data structure to keep track of entries that have already been swapped (i.e. updated), therefore preventing them from being swapped back. However, not only does this involve the introduction of further storage circuits which therefore increase the size, complexity and power consumption of the apparatus, but this would significantly slow down the operation performed by the select circuitry 420. In particular, this would cause the select circuitry 420 to perform a look-up operation for any given index in order to determine which of the two keys was currently in use. Such a delay may be unacceptable for certain storage circuits 498. For instance, if the storage circuitry represents a branch predictor, then this could result in a delay to the fetch process in a pipeline. Such delays are generally not acceptable and consequently could not be used.

One way to resolve this problem is to instead conceptually split the storage circuitry in half.

Figure 5:
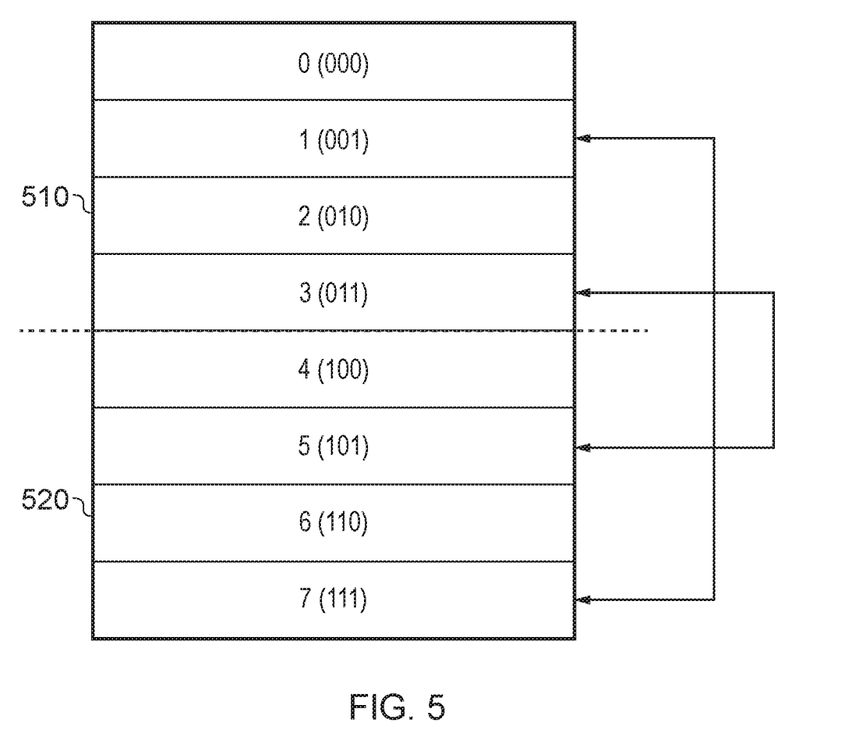
FIG. 5 illustrates a manner in which the storage circuitry can be conceptually split in accordance with some embodiments.

FIG. 5 illustrates a manner in which the storage circuitry can be conceptually split in respect of a single execution context. In particular, in this example, the storage circuitry is made up of eight sets (0 to 8). The selection of the keys is such that, regardless of the how the key is generated, the most significant bit of the new key will be inverted as compared to the previous key. This effectively splits the storage circuitry into two halves 510, 520. Half of the entries 510 having an index with a most significant bit of '0' are in the 'top' half 510 while half the entries 520 having an index with a most significant bit of '1' are in the 'bottom' half 520. In this way, changing keys will cause each entry to move between the two halves 510, 520 of the storage circuitry, a swap will swap one entry of the first half 510 will one entry of the second half 520. Consequently, it is only necessary to perform an update for the first half of the entries 510 of the storage circuitry. Having completed this, entries in the second half 520 will inherently already have been subjected to the update as a consequence of the swap operations taking place. This way, there is no need to provide an update table to determine which key is in operation. In particular, the value has been updated if the index (where index encryption is not used) or the encrypted index (where index encryption is used) is less than the counter value, or where an entry that newly encrypts (using the new key) to the index is less than the counter value.

FIG. 5 illustrates the swap operations that may occur for a single execution context. In particular, a swap occurs between an index 1 and an index 7, and a second swap occurs between an index 3 and an index 5. It will be appreciated that in each of these cases, the most significant bit of the set, as represented in binary, inverts. In particular, set 1 (001) is swapped with set 7 (111) and set three (011) is swapped with set five (101). As a consequence of this technique, the decision making process made by the select circuitry 420 is FIG. 4 becomes more sophisticated.

Figure 6:
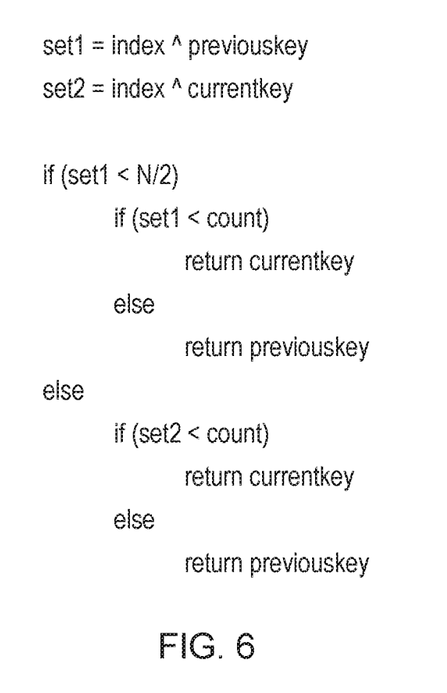
FIG. 6 illustrates a decision-making process for selecting the appropriate key where the index is encrypted, in accordance with some embodiments.

FIG. 6 illustrates, in pseudo-code, an updated decision making process for determining whether a given set has been updated or not. The program begins by determining two values—set1 and set2. Set1 is determined by performing a XOR between the requested index and the previous key. Set2 is determined by providing a XOR between the index and the current key. Having determined these two values, a first condition is considered: If set1 is less than N/2, (where N is the number of entries in the storage circuitry), then a second comparison is considered. At the second comparison, if set1 is less than the count value, then the current key is used, otherwise the previous key is used. If, at the first condition, set1 was not less than N/2, then a third condition is considered. If set2 is less than count, then current key is used, otherwise the previous key is used. Of course, in practice, it will be appreciated that this process will make use of combinatorial logical to perform this determination in parallel rather than sequentially.

This program initially attempts to use the previous key as applied to the index. If the result of this value is less than the count, the previous key was correct, the update process has already been performed and so the appropriate key to use is the current key. If the update process had not yet reached this point, then the previous key remains in use. In looking at the previous key, the value is not less than N/2, it is necessary to consider the corresponding index value (i.e. another index that will newly encrypt to this index). This is achieved by looking at the value set2 which applies the current key to the index (to reverse the encryption). Again, if the value is less than the count, then the update process has already been applied to that index, and so the appropriate key to use is the current key. Otherwise, the previous key is used.

Figure 7:
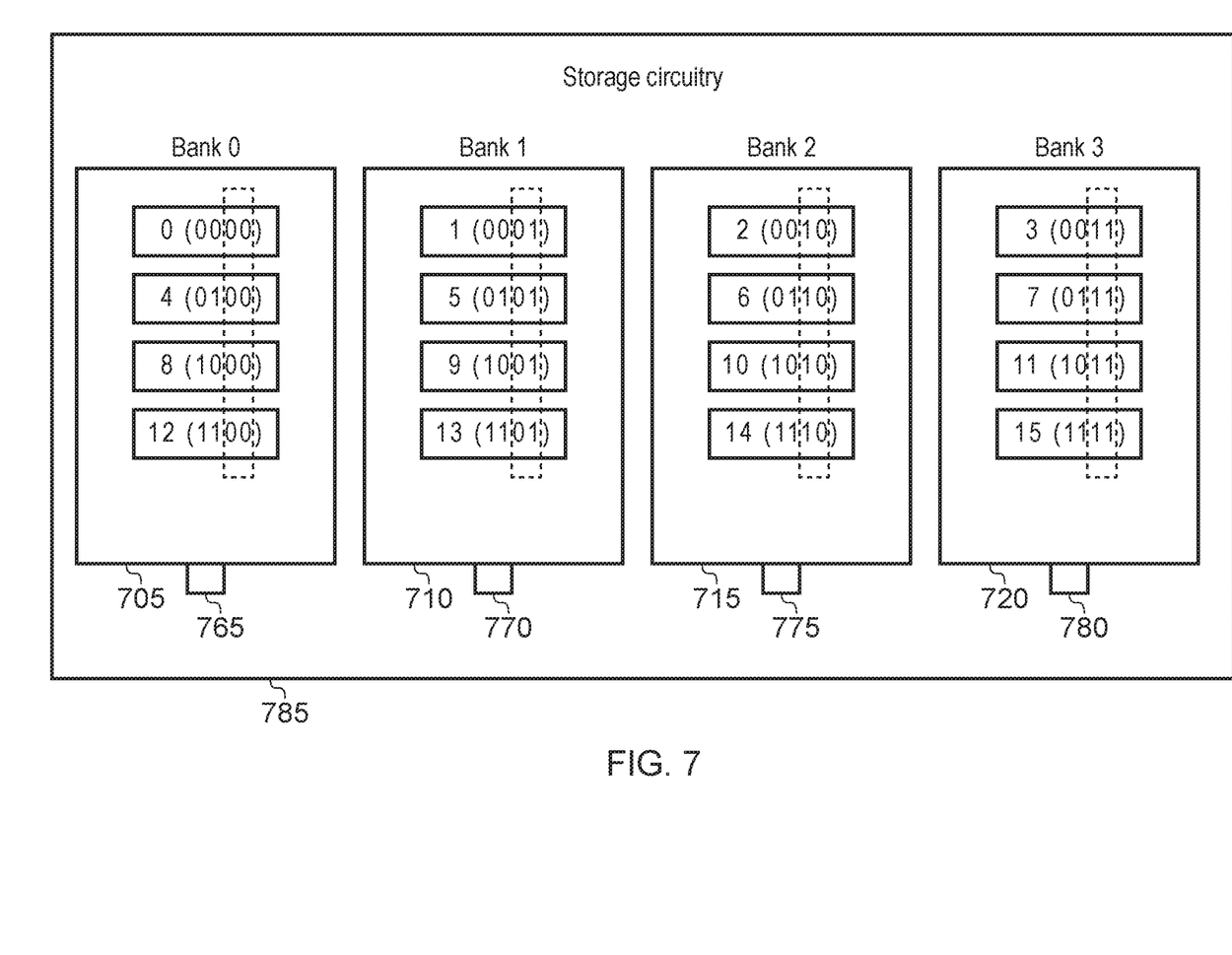
FIG. 7 illustrates an example structure of the storage circuitry in accordance with some embodiments.

FIG. 7 illustrates an example structure of the storage circuitry 785. In this example, the storage circuitry 785 is made up from a number of physical banks 705, 710, 715, 720. Each of the banks 705, 710, 715, 720 is capable of storing a similar number of entries. Depending on the distribution of entries (which will depend on the selection of keys), it is possible that only a subset of these banks 705, 710, 715, 720 will be used during the update process. As illustrated in FIG. 7, each of the banks 705, 710, 715, 720 has a corresponding port 765, 770, 775, 780, which may allow a fixed number of interactions to occur per processor cycle. Consequently, although each of the banks may be written to simultaneously by using all four ports, 765, 770, 775, 780, if only a subset of banks are used then only a small number of updates can be made at each processor cycle. For example, consider the situation in which a swap occurs between index 0 and index 4, both of which are in the same bank 705. A number (x) of processor cycles are spent reading index 0. At least one processor cycle is then be spent determining the new index (4). A further x processor cycles are then be spent writing to index 4. A further x processor cycles are spent (at a similar time) reading the old entry at index 4. Then yet another x processor cycles are spent writing to index 0. During all of this, the process may have to be interrupted if an instruction wishes to access the bank 705, since instructions are given priority over the update process. In contrast, consider the situation in which index 0 is swapped with index 6. Now, the update process utilises two banks 705, 710. Because of this, and because each of the banks 705, 710 has its own port 765, 770, it is possible to read from one bank while writing to another. Consequently, the number of processor cycles required to perform the update can be reduced.

The key selection process can be modified in order to cause updates to occur across banks. In particular, those bits used to identify the bank to which a particular entry belongs can be selected as the bits that must invert during this selection of the key. Other bits used in the key can be selected randomly. As illustrated in FIG. 7, two of the bits of each index (the least significant two bits) determine the bank. Consequently, by ensuring that at least one of these bits changes at each new key as compared to the previous key, it is possible to cause values to rotate between banks at each update. Consequently, a situation in which one bank is overused can be inhibited. Where multiple bits exist, as is the example in FIG. 7, the most significant bit of the bits is the bit used for rotation. Consequently, entries in the first bank 705 will swap with entries in the second and third banks 715, 720. Entries in the second bank 710 will also swap with entries in the second and third banks 715, 720. Entries in the third bank 715 will swap with entries in the first and second banks 705, 710 and entries in the fourth bank 720 will swap with entries in the first and second banks 705, 710.

Based on this mechanism of using different banks for sequential keys, it is necessary to change the method used to determine whether an index has been updated. In particular, the order in which the entries are updated is changed from being a linear order (0, 1, 2, 3 . . . ) to an increasing order in increasing order of set (0, 4, 8, 12, 1, 5, 9, 13, . . . ). This can be achieved by using an incrementing counter 190 as before, which counts the epoch number, and translating this to the index to be updated. In particular, the bank number to update is equal to:

bank=counter & (number_of_banks−1)

Then, the index to update is given by:

index=bank*sets_per_bank+(counter>>log$_2$(bank))

Up until this point, the process illustrated considers how entries belonging to a single execution context are swapped. It might often be the case that only a single execution context will be active at a time. However, in some embodiments, the storage circuitry might contain entries relating to multiple execution contexts. As a consequence of this, a swap might not be practical.

Figure 8:
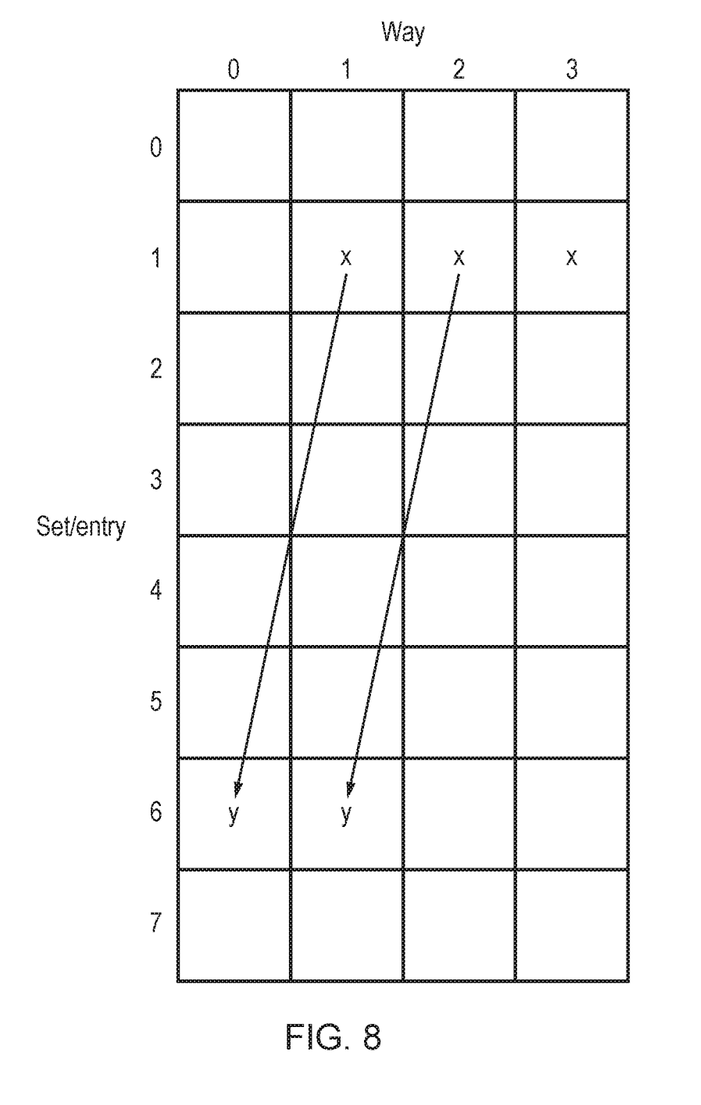
FIG. 8 shows the behaviour of swapping sets when there are multiple execution contexts in simultaneous use.

FIG. 8 illustrates an example in which the storage circuitry 800 is made up from a eight of sets/entries (0-7), which each set/entry being divided into a number of ways (0-3), as may occur with a cache. In this example, a first execution context (labelled x) has three entries in way 1 and the new key associated with execution context x ($K_{x,i}$) indicates that a swap is to occur between way 1 and way 6. In this example, the execution context x has three entries in way 1, but only two entries in way 6. Consequently, a direct swap cannot occur. There is no space to insert the three entries into way 6 because execution context x only 'owns' two of the ways in way 6. To use any of the other ways would overwrite data belonging to another execution context.

Thus, in these embodiments, where the execution context owns fewer ways of the target set than the current set, some of the data is lost. In other embodiments, it may be possible to prioritise certain execution contexts above others and thus, overwriting may be permitted.

Figure 9:
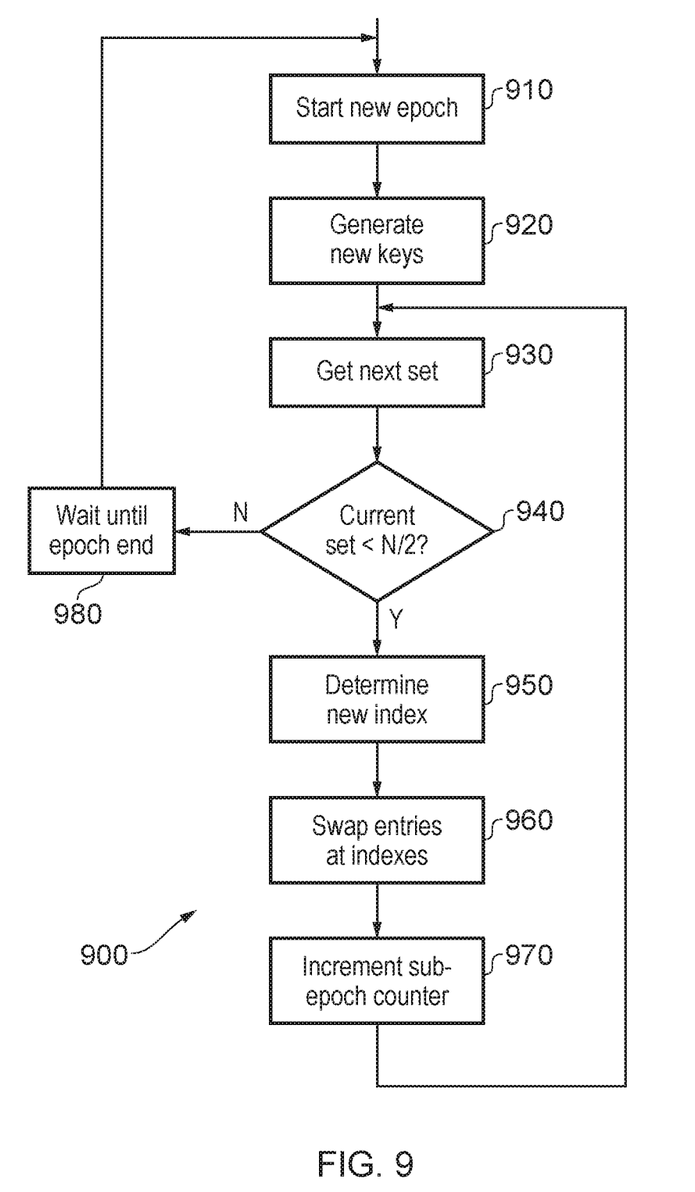
FIG. 9 illustrates a flow chart that shows a method of data processing in accordance with some embodiments.

FIG. 9 illustrates a flow chart 900 in accordance with some embodiments. At a step 910, a new epoch begins. At a step 920, new keys are generated for each of the execution environments. At a step 935, a next set or entry of the storage circuitry is considered. At a step 940, it is determined whether this set index is less than N divided by two, where N is the number of sets in the storage circuitry. If not, then the update process has completed and the process proceeds to step 980 until the current epoch has ended, at which point the process returns to step 910. Otherwise, the process proceeds to step 950 where new index is determined. Having determined the new index, the entries at the two indexes are swapped at step 960, and the sub-epoch counter is incremented at step 970. The process then proceeds to step 930.

In this example, a rolling update process is demonstrated. In particular, having completed an epoch, a new epoch immediately begins. Consequently, an update process is continually being performed by rotating the encryption keys. In other embodiments, at step 940, a waiting period may occur during which the new encryption key continues to be used. After a period of time, a new epoch may begin by returning to step 910.

In accordance with the above, it has been demonstrated how an update process may be provided in order to further improve the security initiated with the storage circuitry. In this way, it becomes more difficult for hacker to decrypt either the data or the index used to store data in the storage circuitry 130. It is anticipated that by such time as the hacker is able to decrypt either of these, the key will have changed thereby rendering the hacker's attempts useless. The update process can be applied by providing a pair of keys for each execution context. In particular, by spreading the update process across a number of processor cycles, the update can be incrementally performed using spare capacity of the storage circuity 130. The above techniques also demonstrate how this process can be made efficient for use in pipelines with branch predictors. In particular, it has been demonstrated how the use of lookup circuitry for whether the update has been applied to a particular entry can be avoided. Furthermore, improvements have been demonstrated in which updates can be split among a number of physical structures such as banks used to implement the storage circuitry thereby lessening the band width acquired by the update process for a specific bank. This makes it more likely that the update process can be performed in time without having to deprioritise use of the storage circuitry in the execution of instructions. As a consequence, there is likely to be a limited performance penalty associated with the loss of data as a consequence of the updated encryption not being performed in time before a previous key must be erased.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   storage circuitry;
   communication circuitry to respond to a retrieve request comprising a requested index with a retrieve response comprising requested data;
   coding circuitry to perform a coding operation using a current key, wherein the current key is based on an execution environment;
   update circuitry to perform an update in response to the current key being changed; and
   count circuitry to count progress of the update, wherein
   the coding operation comprises using the current key to translate the requested index to an encoded index of the storage circuitry at which the requested data has previously been stored and the update comprises an update of the encoded index of the storage circuitry at which the requested data already stored is held;
   the update circuitry is adapted to perform a key update process for the execution environment to make the current key a previous key, and to make a new key the current key;
   the update circuitry is adapted to perform the update over a plurality of processor cycles, across the storage circuitry in a given order;
   the coding circuitry is adapted to perform the coding operation by selecting one of the current key and the previous key;
   when the count circuitry indicates that the update process has reached the encoded index that would be generated using the one of the current key and the previous key, then the encoded index is generated using the current key, and
   when the count circuitry indicates that the update process is before the encoded index that would be generated using the one of the current key and the previous key then the encoded index is generated using the previous key.

2. The data processing apparatus according to claim 1, wherein
   the update circuitry is adapted to perform the key update process after a period of time.

3. The data processing apparatus according to claim 1, wherein
   the update circuitry is adapted to perform the key update process every period of time.

4. The data processing apparatus according to claim 1, wherein
   the given order is based on an index of each entry in the storage circuitry.

5. The data processing apparatus according to claim 1, comprising:
   environment storage circuitry to store a reference to the execution environment in association with the current key.

6. The data processing apparatus according to claim 5, wherein
   the reference to the execution environment is also stored in association with the previous key.

7. The data processing apparatus according to claim 5, wherein
   entries of the environment storage circuitry are accessed in parallel.

8. The data processing apparatus according to claim 1, wherein
the coding circuitry is adapted to perform the coding operation using the current key to translate the requested index to the encoded index of the storage circuitry at which the requested data is stored.

9. The data processing apparatus according to claim 1, wherein
the update circuitry is adapted to invert a most significant bit of the current key to produce the new key.

10. The data processing apparatus according to claim 1, wherein
the storage circuitry comprises a plurality of banks;
given bits of the encoded index indicate which of the banks is used to store the requested data; and
the update circuitry is adapted to invert at least one of the given bits of the current key to produce the new key.

11. The data processing apparatus according to claim 10, wherein
a most significant bit of the given bits is inverted by the update circuitry to produce the new key.

12. The data processing apparatus according to claim 1, wherein
the storage circuitry provides a mapping between program counter values and data associated with the program counter values.

\* \* \* \* \*